F. W. POWERS & M. O. SNEDIKER.
THERMOSTATIC WATER HEATER.
APPLICATION FILED JUNE 14, 1915.
1,195,722.
Patented Aug. 22, 1916.
2 SHEETS—SHEET 2.
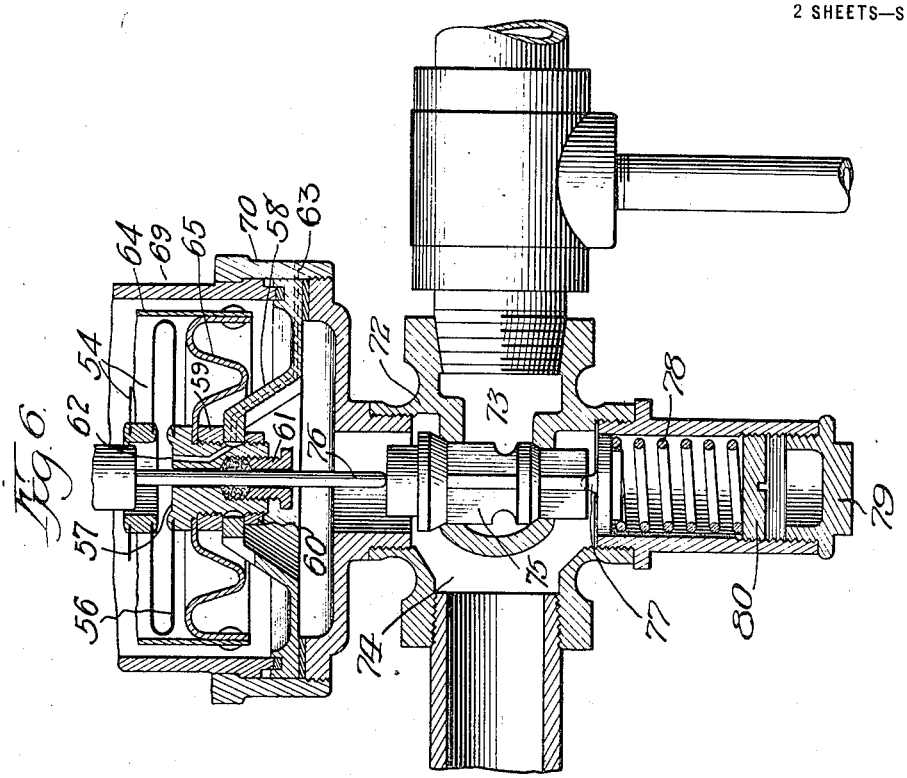
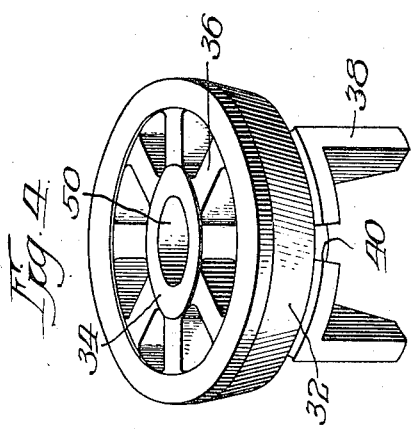
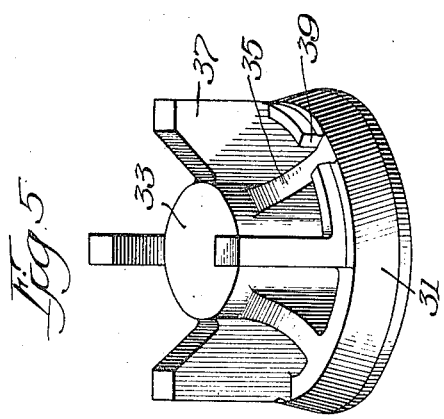

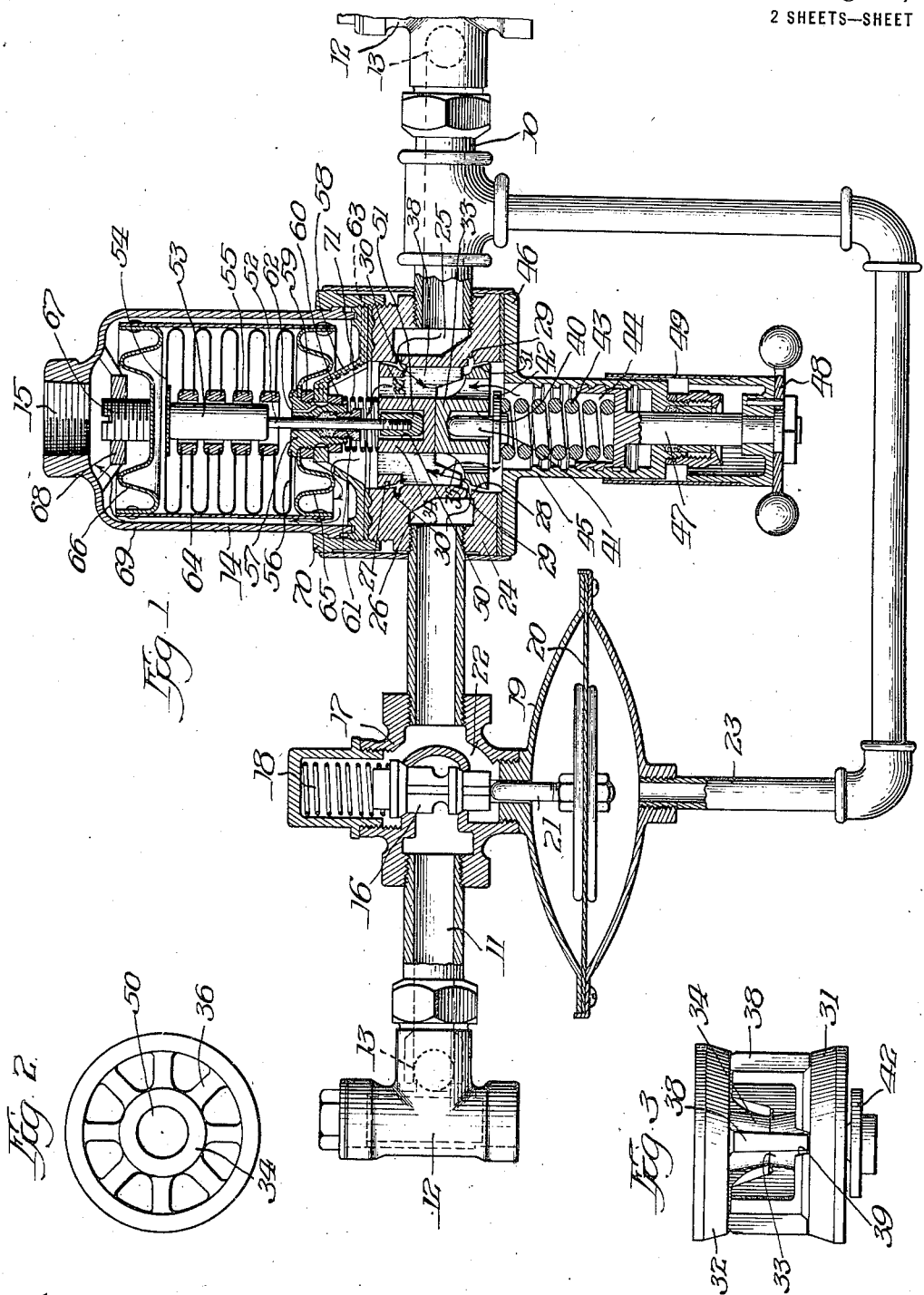

UNITED STATES PATENT OFFICE.

FRED W. POWERS AND MORTON O. SNEDIKER, OF CHICAGO, ILLINOIS, ASSIGNORS TO THE POWERS REGULATOR COMPANY, OF CHICAGO, ILLINOIS, A CORPORATION OF ILLINOIS.

THERMOSTATIC WATER-HEATER.

1,195,722.  Specification of Letters Patent.  Patented Aug. 22, 1916.

Application filed June 14, 1915. Serial No. 33,891.

*To all whom it may concern:*

Be it known that we, FRED W. POWERS and MORTON O. SNEDIKER, citizens of the United States, and residents of Chicago, in the county of Cook and State of Illinois, have invented certain new and useful Improvements in Thermostatic Water-Heaters, of which the following is a specification.

Our invention relates to water heaters and particularly to a water heating device that is thermostatically controlled within itself so that the water may not be heated beyond a predetermined temperature, notwithstanding variations in initial pressures or temperatures.

We employ in this heater a valve shell designed to receive a supply of cold water at one port and a supply of the heating medium, which may be either steam or hot water, at another port with a third port through which delivery is made at the desired temperature. Inasmuch as it is essential in heaters of this kind that the heating medium must at all times be under pressure equal to and preferably exceeding somewhat the cold water supply, we employ an equalizing valve between cold water and heating medium inlets so adapted that regardless of pressure fluctuations in the heating medium the pressure of the cold water supply will automatically adjust itself and thereby always maintain a slight preponderance between the two and in favor of the heating medium.

In the heater we preferably employ a double seated, balanced valve controlling two ports, through one of which the heating medium enters and through the other the supply of fluid to be heated, and the construction of this valve is such that it is moved to its seat, thereby cutting off the heating medium by the expansion of a thermostatic device in the path of the fluid which has passed the valve.

This thermostatic element consists preferably of a metallic bellows which is adapted to be flexed and contracted or elongated proportionate to external pressures which may be exerted upon it. We place this bellows within a non-collapsible metal receptacle supported firmly at its base and otherwise anchored in position so that it may not move or change its form under pressure. Within this receptacle and surrounding the metallic bellows we place a fluid, volatile in its nature and having a boiling point preferably somewhat below the desired temperature to be maintained by this controller. We are careful that this receptacle and the bellows shall be entirely tight and hermetically sealed against the escape of this liquid. This receptacle being in the path of the water as it leaves the mixing valves is heated thereby and the volatile fluid accordingly volatilized so that a pressure is exerted upon the external surface of the bellows, tending to collapse the same. Collapsing this bellows gives movement to the stem within its center and this communicates the movement to the valves, tending to close them against the heating medium and at the same time open them to the fluid that is to be heated.

Great difficulty is ordinarily experienced in making double-seated or so-called balanced valves entirely tight upon both their seats and in order to permit of getting such results in this device, we make the two valves separate, merely contacting them at their centers, and, furthermore, we provide contact merely between the valves and their operating stems, so that any lateral movements which may occur in the bellows or which may be necessary to the proper seating of the valves can occur regardless of the main valve stem which is fixed in its position within the packing box and gland. A coiled spring, the tension of which is changed by the adjusting screw, operates to return the valves to their original position, and, being under tension at all times, keeps valves and stems in contact with each other so that they need not in any way be connected.

Adjustment for a very low temperature is secured by backing out the screw and consequently relieving the tension on the adjusting spring. In order to insure that the valve shall seat firmly against the heating medium when this adjusting spring is completely relaxed, we place another spring of lesser strength above the valve and in such a position that it operates to close the same, even though there may be no pressure exerted by the volatile fluid upon the bellows. This permits of adjusting the machine so that it will pass entirely cold water when desired, which cold water would have no effect on the volatile fluid.

The two halves of the mixing valve are hollowed out in centers and provided with wings for guidance but leaving nevertheless a very considerable space within them in which a proper mixture of fluid and heating medium may be made. This mixture is subsequently guided by the peculiar shape of the receptacle which incloses the bellows so as to bring it in contact with as large a portion of the superficial area of the receptacle as possible thereby increasing the temperature effect upon the volatile fluid contained within the receptacle.

The interior of the bellows is vented, as will be seen, down through the supporting base, through the supporting bridge and out through the side of the controller; this permitting the free movement of air when the bellows is collapsed, and also permitting the escape of any water which might find its way through the packing box.

It should be borne in mind that there are many so-called mixers on the market now, they being practically all mechanical devices by which the valves can be arbitrarily set to secure a certain mixture of the hot and cold fluids. Such a mixer will deliver water at a reasonably uniform temperature so long as nothing disturbs the temperature or pressure of the supply lines, but if any such change does occur, a new adjustment becomes necessary as such valves will not adjust themselves automatically to the new conditions. Our valve, because of its thermostatic feature, gives the desired results.

The arrangement of narrow annular ports entirely surrounding the valve chamber and admitting the cold and hot fluids to the center of the valve itself secures a thorough and immediate mixture of the two fluids and practically without noise. The valves are hollowed out in their centers and provided with certain baffle plates that permit of this and contribute to a more thorough mixing before the combination of fluids strikes the thermostatic element.

The invention will be more readily understood by reference to the accompanying drawings, wherein, Figure 1 is a sectional view of the novel device contemplated by us for securing a regulated mixture of hot and cold fluids; Fig. 2 is a plan view of one of the valves used in controlling a fluid inlet; Fig. 3 is a side elevation of the two controlling valves in their combined position; Figs. 4 and 5 are perspective views of the same valves showing the same in their position prior to assembling, and Fig. 6 is an enlarged sectional view of a somewhat modified form of the mixer shown in Fig. 1.

Referring more particularly to Fig. 1, it will be seen that we provide a hot fluid inlet 10, and a cold fluid inlet 11. Located in each conduit is a strainer 12, and a ball check valve 13. These check valves are necessary for the reason that a material increase in pressure in either the hot or cold fluid when the outlet for the mixture is closed might result in the backing up of the fluid of the lesser pressure and the escape of the fluid of the greater pressure. Interposed at the junction of the hot and cold fluid conduits is a heater or heat equalizer 14, in which an outlet 15, is provided for the combined fluids. It not infrequently happens that pressure of cold fluid exceeds that of the heating medium and this fact will tend to cause an uncertain and unsatisfactory operation of the thermostatic control. To obviate this difficulty we provide a pressure equalizer in the cold water line. This device may consist of a balanced valve 16, mounted in a casing 17, which casing also carries a coiled spring 18, which acts upon the valve 16 to force it toward its seat. Mounted in proximity to the casing 17 is a diaphragm casing 19, within which a diaphragm 20 is secured. A stem 21, carried by the diaphragm, projects through an opening in the casing 19, which opening is considerably larger than the diameter of the stem and abuts the lower end of the valve 16. The valve casing 17 is preferably interposed in the cold water line, and a space 22 is provided in the casing 17 on the "low pressure" side of the valve 16. A pipe 23 communicates with the hot water inlet 10, and the pressure of the hot water is directed against the diaphragm 20, on the opposite side to that of the cold water. The result of such construction is that the hot fluid is given a slight predominance in pressure equal to the force of the spring 18, acting on the valve 16. Of course, if there was no spring 18 acting upon the valve, the pressures of the hot and cold fluids entering the heat equalizer would be the same irrespective of variations in pressure in the service pipes. However, the use of the spring enables us to secure a slight predominance in the pressure of the hot fluid.

The heater or heat equalizer, as best shown in Fig. 1, may consist of a casing 24, having a hot fluid inlet port 25, and a cold fluid inlet port 26, which ports extend substantially entirely around the valve chamber. Seats 27, 28 are formed on the walls of the casing and are oppositely inclined. The seats are, as best shown in Fig. 1, intersected by seats 29, 30, which communicate with the inlet ports 25, 26 respectively. This form of construction provides for an extended opening, with the result that the fluids enter in a thin stream or sheet, the fluids being spread out to such an extent that the mixture of the hot and cold fluids occurs instantly upon their combination.

Mounted within the valve chamber are two valves, best shown in Figs. 2 to 5 inclusive, these valves comprising annular ring-like seats 31, 32, a core 33, 34, and webs 35, 36 joining the valve proper and the core. Legs 37, 38 are formed as a continuation of some of the webs 36, and a notch 39, 40 in the metal in each valve member provides a seat for the extremity for one of the legs of the opposing member, as best shown in Fig. 3. In service the cores 33, 34 are in contact. The legs may or may not be in contact as desired. By the construction of this valve in two parts and each valve having an oppositely inclined seat we are abled to assemble the same in the casing as described and to operate the valves as a unitary device by means of the mechanism hereafter described.

In a recess 40, in the lower valve member we mount a short stem 41, having a rounded end and provided with an annular flange 42, against which a spring 43, is adapted to abut. The opposite end of the spring is confined within a hollow cylinder 44, the outer portion of which is threaded and in engagement with the internally threaded cylinder 45, the flange 46, of which is secured to the casing 24. A flange 47, is secured to the threaded cylinder 44, and a hand wheel 48, is connected to the shank. This provides means for adjusting the compression of the spring 43. A sleeve 49, is carried by the hand-wheel member 48, which sleeve surrounds the cylinder 45. If desired figures representing different temperatures may be inscribed upon the surface of the cylinder 45, and the sleeve 49, may be used as an indicator of the adjustment of the device. By the use of the construction shown, that is, by rounding the end of the stem 41, and mounting the same within a recess considerably smaller than the stem, we provide for freedom of action of the valve member controlled thereby and no distortion of the spring or operating parts will affect the valve member.

The upper valve member is likewise provided with a recess 50, at its axis, and within this recess we mount the enlarged end 51, of a stem 52. This enlarged end is likewise rounded for the purpose described in connection with the stem 41. The stem 52, abuts a shorter stem or cylinder 53, the upper end of which abuts the free end 54, of a bellows. The bellows may, as shown, consist of any number of sections joined at their middle portions by the rings 55, the lower end 56, of the bellows being fixed in a plug 57, and held rigidly against the member 58 by means of the nuts 59, 60. A gland 61, seals the interior of the bellows from the fluid passing through and around the valve. The plug, as shown in Fig. 1, is provided with a vent or drain opening 62, which opening is continued through the member 58, as indicated in dotted lines at 63. This vent communicates with the atmosphere and provides for ready passage of air as required, by the collapsing or expanding of the bellows and for the escape of any liquid which might find its way into the bellows.

Surrounding the bellows is a rigid container or receptacle which in the present instance consists of the cylinder 64, and the corrugated heads 65, 66. The lower head 65 is apertured at its axis to accommodate the plug 57, and is rigidly held in connection therewith. The upper head 66 is not apertured but is adapted to be held rigidly by abutting engagement of a screw 67, carried by a transverse bracket 68. Surrounding the container or cylinder 64 is a casing 69, which is rigidly secured to the valve casing 24 by the large union nut 70. This casing 69 carries the outlet opening 15 for the combined fluids. Located within the cylinder 64 and surrounding the bellows we place a volatile fluid having a boiling point lower than the temperatures which are ordinarily desired. This volatile liquid when heated above its boiling point, expands and causes a partial collapse of the bellows and therefore a downward movement of the stem 52, and consequently of the combined control valves, this downward movement being against the pressure of the spring 43. Inasmuch as the device is ordinarily used as a shower controller and as many users wish absolutely cold water, we have provided the auxiliary spring 71, working in opposition to the spring 43, but of less capacity. When a user desires cold water it has been found that the bellows will not have the effect of completely closing the hot water inlet port. By the installation of the spring 71 the action of the bellows is taken up after a temperature is reached below that at which the volatile liquid acts upon the bellows. By placing the thermostatic element within a rigid non-collapsible container, no effect of differences in the pressure of the fluids is felt thereby and the thermostat will operate with uniformity notwithstanding great variations in pressure.

Inasmuch as it may be found desirable at times to control only the hot fluid and to provide a constant supply of the cold fluid, we may wish to employ the construction shown in Fig. 2. The thermostatic element remains the same as that heretofore described. We have, however, substituted a valve casing 72, having a hot fluid inlet 73, and a cold fluid inlet 74. It will be seen that the cold fluid is not valved and may pass directly into contact with the thermostat. However, for controlling the hot fluid we provide the balanced valve member 75, acted upon at its upper end by the stem 76, controlled by the thermostat and at its lower end by the stem 77, controlled by the spring 78. The adjustment of the spring 78, is secured by removing the cap 79 and rotating the nut 80, which engages one end of the spring.

The construction is capable of much modification, and such modifications as are within the scope of our claims we consider within the spirit of our invention.

We claim:

1. In means for heating water, the combination of a casing, a thermostatic element located in said casing, hot and cold fluid inlets to said casing, means controlled by the thermostatic element for regulating the supply of hot and cold fluid, and means for equalizing the entrance pressures of said hot and cold fluids, substantially as described.

2. In a device of the class described, the combination of a casing having hot and cold fluid inlets, a valve for regulating the amount of said fluids admitted to said casing, a thermostatic element connected to and controlling said valve, and means acted upon by said hot and cold fluids for equalizing the entrance pressures of said hot and cold fluids, substantially as described.

3. In a device of the class described, a casing having hot and cold fluid inlets, a thermostatic element in said casing and adapted to control the extent of opening of one of said fluid inlets, and a pressure equalizer acted upon by both said hot and said cold fluids and adapted to substantially equalize the pressures of the hot and cold fluid entering said casing, substantially as described.

4. In a water heater, the combination of a casing having hot and cold fluid inlets, a valve for controlling at least one of said inlets, a thermostat acting upon said valve, and a pressure equalizer located extraneously of said casing and in communication with the hot and cold fluid lines whereby the pressure of the hot and cold fluids entering said casing is substantially equalized, substantially as described.

5. In a water heater, the combination of a casing having hot and cold fluid inlets, a valve controlling said inlets, a rigid non-collapsible container within said casing, and a collapsible element within said container, said collapsible element being adapted to act upon said valve, and a volatile fluid within said container, substantially as described.

6. In a water heater, the combination of a casing having hot and cold fluid inlets, a pair of valves controlling said inlets, said valves normally operating in unison to close one inlet to the same extent that the other inlet is opened, spring means for moving said valves in one direction and combined spring and thermostatic means for moving said valves in another direction, substantially as described.

7. In a device of the class described, the combination of a casing having two inlets, a valve controlling each inlet, said valves when in position being operable as a unitary valve, said valves controlling said hot and cold fluid inlets and being constructed to permit the combination of the two fluids while passing through the body of the valves, spring means for forcing said two valves in one direction and thermostatic means for moving the valves in an opposite direction, substantially as described.

8. In a water heater, the combination of a casing having a valve chamber, a plurality of annular ports located on the interior of and surrounding said valve chamber, a valve controlling each of said ports, and means for moving said valves to control the amount of hot and cold fluids admitted, said means including a thermostat for moving said valves in one direction and a spring for moving the same in an opposite direction, the arrangement being such that a thin stream of both the hot and cold fluids is admitted into the valve chamber and a thorough mixture thereof occurs in said chamber, substantially as described.

9. In a water heater, the combination of a casing having a valve chamber, a plurality of peripheral slots on the interior wall of said chamber, a cold fluid connection to one of said slots and a hot fluid connection to another of said slots, a pair of valves movable in unison to control the extent of opening of said grooves into said valve chamber and means for simultaneously moving said valves, said means including a thermostat for moving said valves in one direction and a spring for moving the same in an opposite direction, whereby said hot and cold fluids are admitted in a thin sheet around the periphery of said valves and thorough mixture is made within the valve chamber, substantially as described.

10. In a device of the class described, the combination of a casing having a valve chamber and provided with hot and cold fluid inlets which terminate in internal grooves in said valve chamber, and a pair of skeleton valves having ring-like valve seats, said skeleton valve being located in said valve chamber and when combined operating as a single valve, and thermostatic means for controlling the actuation of said combined valves, substantially as described.

11. In a device of the class described, the combination of a valve casing having a chamber, hot and cold fluid inlets to said casing, which inlets terminate in peripheral grooves within said chamber, a pair of skeleton valves located in said chamber, said valves being constructed to permit the free passage of water therethrough, thermostatic means for controlling the actuation of said combined valves, the arrangement being such that the fluids of different temperature are admitted in thin streams throughout the peripheral area of said skeleton valves and thoroughly mixed in their passage through the body of the valves, substantially as described.

12. In a device of the class described, the combination of a rigid casing having a chamber provided with a plurality of valve seats, a pair of valves in said chamber and coöperating with said seats, said valves being unconnected but in an abutting engagement with each other, spring means for moving said combined valves in one direction and thermostatic means for moving the valves in another direction, substantially as described.

13. In a device of the class described, the combination of a one-piece casing having a valve chamber therein, said casing being provided with oppositely inclined valve seats in said chamber, and a pair of valves coöperating with said seats, said valves being unconnected but in abutting engagement, spring means for moving said valves in one direction and thermostatic means for moving said valves in the other direction, substantially as described.

14. In a device of the class described, the combination of a casing having a valve chamber and provided with a pair of oppositely inclined peripheral valve seats, a pair of annular ring-like valves having free openings through the body thereof, spring means for moving said valves in one direction and thermostatic means for moving said valves in an opposite direction, substantially as described.

15. In a device of the class described, the combination of a casing having a pair of valves therein, a container associated with said casing, a rigid cylinder within said container, a collapsible bellows within said cylinder, a volatile fluid within said cylinder, and a stem operable by said bellows to actuate said valves in one direction, substantially as described.

16. In a device of the class described, the combination of a casing having a pair of valves therein, a container associated with said casing, a rigid cylinder within said container, a collapsible bellows within said cylinder, a volatile fluid within said cylinder, and a stem operable by said bellows to actuate said valves in one direction, said stem being in abutting engagement only with said valves, substantially as described.

17. In a device of the class described, the combination of a casing having a pair of valves therein, a container associated with said casing, a rigid cylinder within said container, a collapsible bellows within said cylinder, a volatile fluid within said cylinder, and a stem operable by said bellows to actuate said valves in one direction, said stem having a rounded end and one of said valves having a recess larger than said stem and for engagement thereby, substantially as described.

18. In a water heater, the combination of a casing having hot and cold fluid inlets, a valve for controlling one of said inlets and a thermostat for controlling said valve, said thermostat comprising a non-collapsible cylinder, a bellows in said cylinder and hermetically sealed therefrom, a volatile fluid in said cylinder and adapted upon expansion to compress said bellows, and operative connections between said bellows and said valve, substantially as described.

19. In a water heater, the combination of a casing having hot and cold fluid inlets, a valve for controlling one of said inlets and a thermostat for controlling said valve, said thermostat comprising a non-collapsible cylinder, a bellows in said cylinder and hermetically sealed therefrom, a volatile fluid in said cylinder and adapted upon expansion to compress said bellows, operative connections between said bellows and said valve, said bellows being provided with a drain having communication with the atmosphere, substantially as described.

20. In a water heater, the combination of valved inlets for hot and cold fluids and a thermostat for controlling said inlets, said thermostat including a cylinder adapted to contain a volatile liquid, a bellows within said cylinder and sealed therefrom, one end of said bellows being anchored and the other end mounted for freedom of movement, and a stem connecting the controlling valves to said bellows, said stem contacting said bellows at the unattached end thereof, substantially as described.

21. In a water heater, the combination of a casing providing hot and cold fluid inlets, valves controlling said inlets, a spring adapted to move said valves in one direction and a thermostat adapted to move the valves in the opposite direction against said spring pressure, said thermostat comprising a cylinder around which the water is adapted to circulate, said cylinder being rigid and non-collapsible, a bellows within said cylinder, liquid within said cylinder and surrounding said bellows, substantially as described.

22. In a water heater, the combination of a casing providing hot and cold fluid inlets, valves controlling said inlets, a spring adapted to move said valves in one direction and a thermostat adapted to move the valves in the opposite direction against said spring pressure, said thermostat comprising a cylinder around which the water is adapted to circulate, said cylinder being rigid and non-collapsible, a bellows within said cylinder, liquid within said cylinder and surrounding said bellows, and a stem extending through the axial center of said bellows and adapted to act upon said valves, substantially as described.

23. In a device of the class described, the combination of a casing having hot and cold fluid inlets on opposite sides thereof, said inlets terminating in peripheral grooves within said casing, a pair of valves operable in unison to simultaneously restrict the area of opening of one inlet while enlarging the opening of the other inlet, a spring for causing movement of said combined valves in one direction and a thermostat for moving the valves in another direction, said casing being provided with a heated water outlet, said thermostat including a rigid non-collapsible cylinder interposed in the line between said valves and said outlet, substantially as described.

24. In a device of the class described, the combination of a casing having inlets for hot and cold fluid, a balanced valve controlling said inlets, a spring tending to open the hot fluid inlet, a thermostatic unit and a non-collapsible container around which the fluid passes, said thermostatic unit acting independent of the pressure of the fluid to move said valve against the pressure of said spring substantially as described.

25. In a device of the class described, the combination of a casing having hot and cold fluid inlets, a single valve controlling said inlets, a fluid outlet, a non-collapsible container interposed between said inlets and said outlet, a volatile fluid within said rigid container and bellows also within said container and adapted to be collapsed by expansion of said volatile fluid, said bellows acting in one direction on said valve, substantially as described.

26. In a device of the class described, the combination of a casing having hot and cold fluid inlets and an outlet, a valve controlling said inlets, and a non-collapsible heat conducting container interposed between said inlets and said outlet, the arrangement of said container being such that fluid passing from said inlets to said outlet shall contact substantially the entire superficial area of said container, a collapsible element mounted within said non-collapsible container, and an expansible fluid within said container and acting upon said collapsible element to move said valve in one direction, substantially as described.

Signed at Chicago, Illinois this 9th day of June, 1915.

FRED W. POWERS.
MORTON O. SNEDIKER.

Witnesses:
HELOISE FULLER,
PAUL O. KODERISCH.